United States Patent
Xie et al.

(10) Patent No.: US 9,679,393 B2
(45) Date of Patent: Jun. 13, 2017

(54) OPTICAL-FLOW IMAGING SYSTEM AND METHOD USING ULTRASONIC DEPTH SENSING

(71) Applicant: SZ DJI TECHNOLOGY CO., LTD., Shenzhen, Guangdong (CN)

(72) Inventors: Jiebin Xie, Guangdong (CN); Bo Zang, Guangdong (CN); Wei Ren, Guangdong (CN); Guyue Zhou, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/181,392

(22) Filed: Jun. 13, 2016

(65) Prior Publication Data
US 2016/0300361 A1    Oct. 13, 2016

Related U.S. Application Data

(63) Continuation of application No. PCT/CN2014/094331, filed on Dec. 19, 2014.

(51) Int. Cl.
*G06K 9/00* (2006.01)
*G06T 7/20* (2017.01)
(Continued)

(52) U.S. Cl.
CPC ............ *G06T 7/2033* (2013.01); *G06F 15/18* (2013.01); *G06T 7/246* (2017.01);
(Continued)

(58) Field of Classification Search
None
See application file for complete search history.

(56) References Cited

U.S. PATENT DOCUMENTS 7,003,136 B1 *   2/2006   Harville ............. G06K 9/00201
                                                              348/169
8,265,425 B2 *   9/2012   Ng-Thow-Hing .... G06T 7/0042
                                                              382/199
(Continued)

FOREIGN PATENT DOCUMENTS

CN       102298070 A     12/2011
JP       2000222585 A     8/2000
(Continued)

OTHER PUBLICATIONS

WO, International Search Report and Written Opinion, PCT/CN2014/094331, Sep. 22, 2015.

*Primary Examiner* — Shervin Nakhjavan
(74) *Attorney, Agent, or Firm* — Anova Law Group, PLLC

(57)    ABSTRACT

An optical-flow imaging system having an ultrasonic array for generating images that include depth data, and methods for manufacturing and using same. The optical-flow imaging system includes an ultrasonic sensor array positioned on a housing that includes an ultrasonic emitter and a plurality of ultrasonic sensors. The optical-flow imaging system also includes a Red, Green Blue (RGB) camera assembly positioned on the housing in a parallel plane with, and operably connected to, the ultrasonic sensor. Thereby, the optical-flow imaging system advantageously enables improved imaging in a wide variety of lighting conditions compared to conventional systems.

28 Claims, 13 Drawing Sheets

(51) Int. Cl.
*G06F 15/18* (2006.01)
*H04N 13/00* (2006.01)
*H04N 13/02* (2006.01)
*G06T 7/246* (2017.01)

(52) U.S. Cl.
CPC ..... *H04N 13/0022* (2013.01); *H04N 13/0271* (2013.01); *G06T 2207/10016* (2013.01); *G06T 2207/10028* (2013.01)

(56) References Cited

U.S. PATENT DOCUMENTS

| | | | | |
|---|---|---|---|---|
| 8,405,680 | B1* | 3/2013 | Cardoso Lopes | G06T 15/50 345/426 |
| 8,717,355 | B2* | 5/2014 | Newton | G06T 15/503 345/421 |
| 2003/0206652 | A1* | 11/2003 | Nister | G06T 7/0065 382/154 |
| 2004/0095357 | A1* | 5/2004 | Oh | G06T 15/205 345/589 |
| 2006/0020562 | A1 | 1/2006 | Murali | |
| 2009/0225300 | A1 | 9/2009 | Barrows et al. | |
| 2010/0328437 | A1* | 12/2010 | Lee | G01C 11/06 348/47 |
| 2012/0039525 | A1* | 2/2012 | Tian | G06T 5/005 382/154 |
| 2012/0056982 | A1* | 3/2012 | Katz | H04N 13/025 348/43 |
| 2012/0249831 | A1* | 10/2012 | Porter | H04N 5/23206 348/231.3 |
| 2012/0274626 | A1* | 11/2012 | Hsieh | H04N 13/0011 345/419 |
| 2012/0307010 | A1* | 12/2012 | Evertt | G06T 7/0083 348/46 |
| 2013/0100774 | A1* | 4/2013 | Brown | G01S 15/931 367/99 |
| 2013/0156278 | A1 | 6/2013 | Kim et al. | |
| 2013/0222589 | A1* | 8/2013 | Lalonde | G08G 1/165 348/148 |
| 2014/0002592 | A1* | 1/2014 | Takahashi | H04N 19/00769 348/42 |
| 2014/0078262 | A1* | 3/2014 | Yun | H04N 13/0051 348/47 |
| 2014/0211991 | A1* | 7/2014 | Stoppa | G06K 9/00355 382/103 |
| 2015/0049169 | A1* | 2/2015 | Krig | G06T 7/0075 348/46 |
| 2015/0049937 | A1* | 2/2015 | Choi | G06T 7/0051 382/154 |
| 2015/0103183 | A1* | 4/2015 | Abbott | G06T 7/204 348/169 |
| 2015/0127259 | A1* | 5/2015 | Kazemipur | G01C 21/00 701/541 |
| 2015/0154447 | A1* | 6/2015 | Wilson | G06K 9/00624 382/103 |
| 2015/0310620 | A1* | 10/2015 | Aviv | G06T 7/0057 382/154 |
| 2016/0070265 | A1* | 3/2016 | Liu | B64C 39/024 701/3 |
| 2016/0206205 | A1* | 7/2016 | Wu | A61B 5/0073 |

FOREIGN PATENT DOCUMENTS

| | | |
|---|---|---|
| JP | 2004234350 A | 8/2004 |
| JP | 2010140476 A | 6/2010 |
| JP | 2010193227 A | 9/2010 |
| JP | 2011215968 A | 10/2011 |
| JP | 2014168227 A | 9/2014 |

* cited by examiner

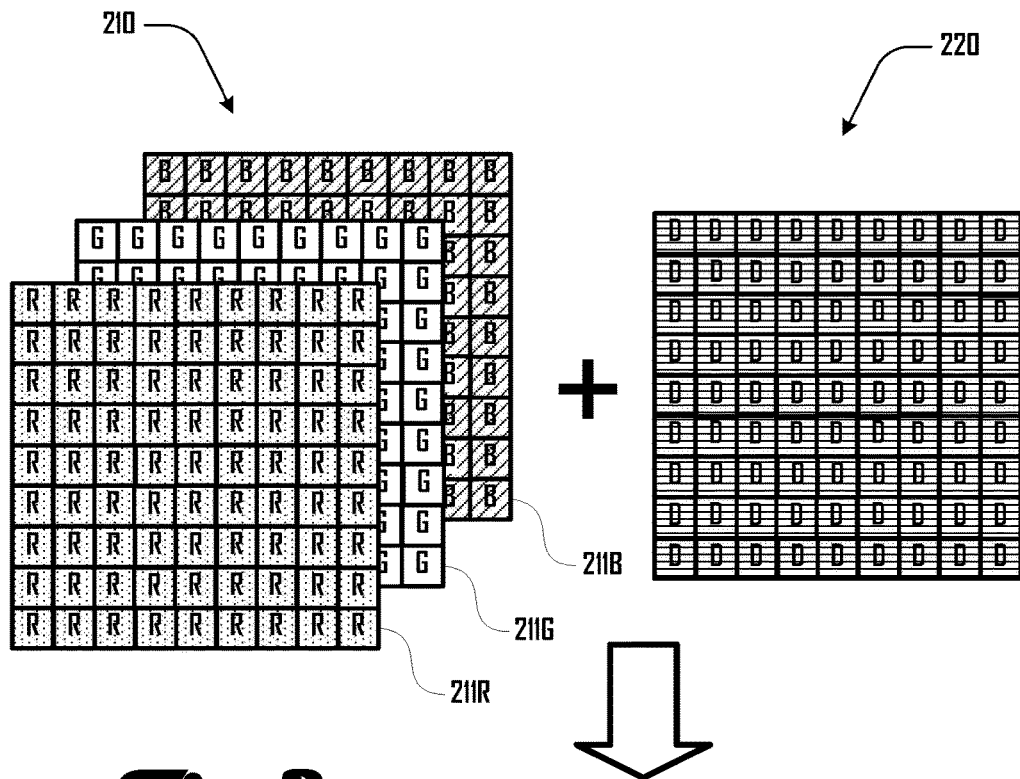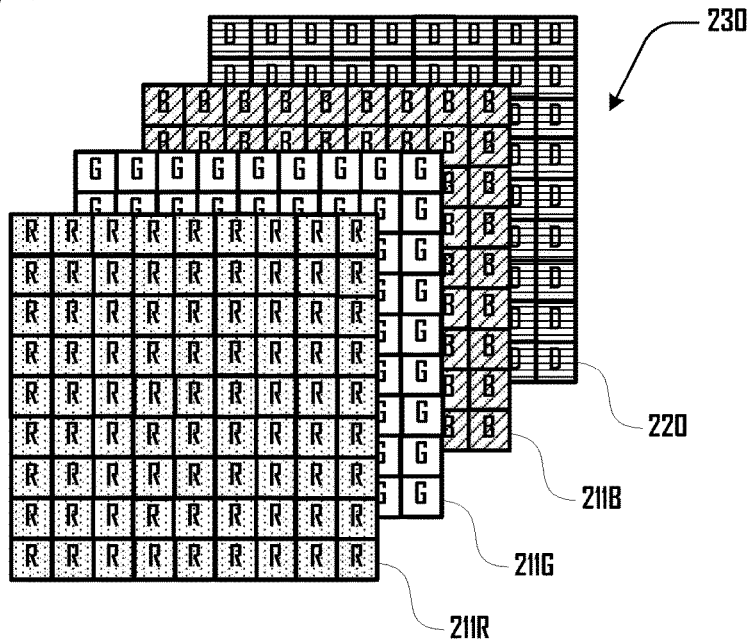
Fig. 2

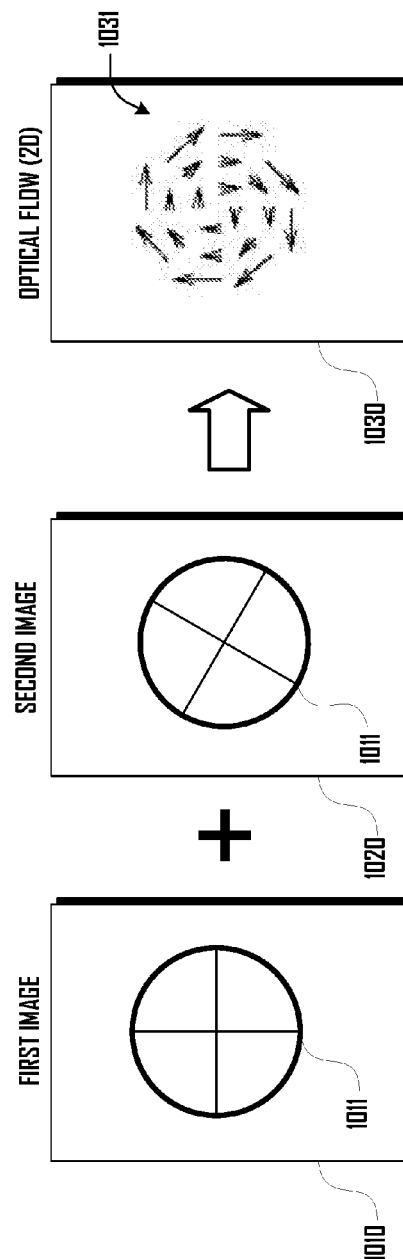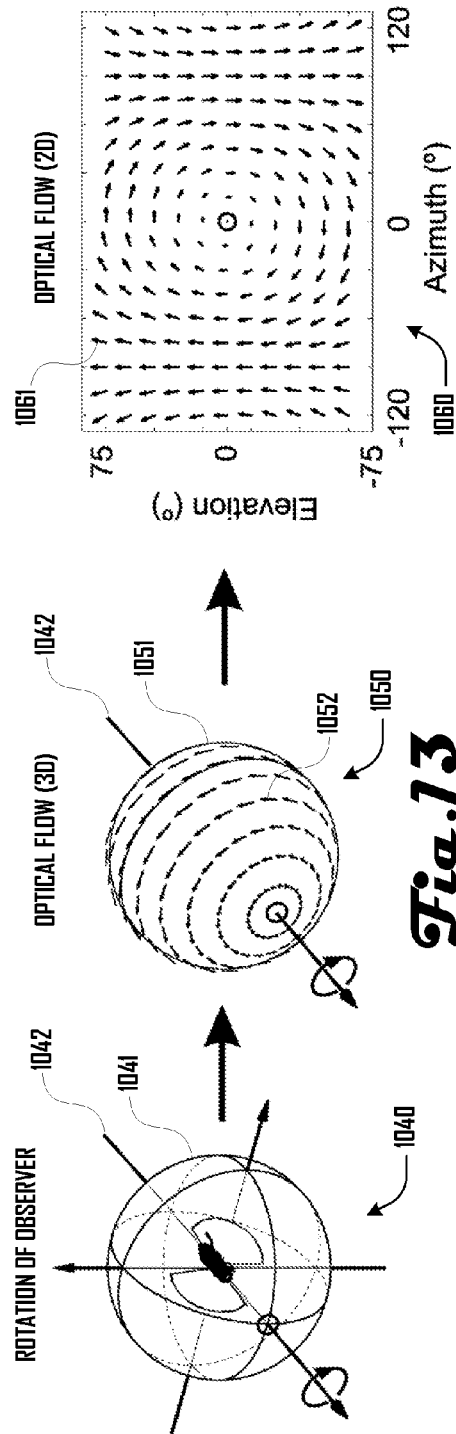

OPTICAL-FLOW IMAGING SYSTEM AND METHOD USING ULTRASONIC DEPTH SENSING

CROSS-REFERENCE TO RELATED APPLICATIONS

This application is a continuation of, and claims priority to, copending PCT Patent Application Number PCT/CN2014/094331, which was filed Dec. 19, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates generally to digital imaging, computer vision and ultrasonic sensing, and more specifically, but not exclusively, to optical-flow imaging systems and methods.

BACKGROUND

A Red, Green, Blue plus Depth (RGB-D) camera is a camera capable of generating three-dimensional images (a two-dimensional image in a plane plus a depth diagram image). Conventional RGB-D cameras have two different groups of sensors. One of the groups comprises optical receiving sensors (such as RGB cameras), which are used for receiving ambient images that are conventionally represented with respective strength values of three colors: R (red), G (green) and B (blue). The other group of sensors comprises infrared lasers or structured light sensors for detecting a distance (or depth) (D) of an object being observed and for acquiring a depth diagram image. Applications of RGB-D cameras include spatial imaging, gesture identifications, distance detection, and the like.

One type of RGB-D camera applies an infrared light source for imaging (e.g., the Microsoft Kinect). Such a camera has a light source that can emit infrared light with specific spatial structures. Additionally, such a camera is equipped with a lens and a filter chip for receiving the infrared light. An internal processor of the camera calculates the structures of the received infrared light, and through variations of the light structures, the processor perceives the structure and distance information of the object.

Conventional RGB-D cameras, such as the Microsoft Kinect, utilize an infrared light detection approach for acquiring depth information. However, the approach based on infrared light detection works poorly in outdoor settings, especially for objects illuminated by sunlight because the sunlight spectrum has a strong infrared signature that can conceal the infrared light emitted from a detector. Some infrared light detectors attempt to solve this issue by increasing their power, (e.g., with laser or by increasing the strength of the light source). However, this approach is undesirable because it requires greater power consumption.

Optical flow is a pattern of apparent motion of objects, surfaces and edges in a visual scene caused by the relative motion between a camera and the scene. Conventional optical flow is only able to compare movement relative to a pixel field, and not in terms of real-world distances and velocities. Accordingly, conventional optical-flow systems and methods are not suitable for robust applications in real-world environments including navigation of mobile platforms such as unmanned aerial vehicles (UAVs) or other vehicles.

In view of the foregoing, a need exists for an improved optical-flow imaging system and method to overcome the aforementioned obstacles and deficiencies of conventional optical-flow imaging systems.

SUMMARY

One aspect includes a method of determining optical-flow in physical space that includes determining optical-flow velocities of a plurality of special feature points in physical space, wherein the special feature points are identified in RGB image data, and wherein depth data associated with the special feature points is used to obtain units in physical space. In one embodiment, the RGB image data is obtained by an RGB camera. In another embodiment, the depth data is obtained by an ultrasonic sensor array.

In a further embodiment, the method also includes generating a first RGB-D image using an RGB camera assembly and a first ultrasonic array. In a still further embodiment, the method also includes identifying a plurality of special interest points in an RGB portion of the first RGB-D image. In one embodiment, the method also includes generating a second RGB-D image using the RGB camera assembly and the first ultrasonic array.

In another embodiment, the method also includes determining a pixel velocity of a portion of the special feature points by comparing the RGB portions of the first and second RGB-D images. In a further embodiment, the method also includes converting determined pixel velocity of the portion of the special feature points to velocity in physical space using depth data of the first and second RGB-D images. In yet another embodiment, the method also includes generating a third RGB-D image using the RGB camera assembly and the first ultrasonic array.

In one embodiment, the method further includes determining a pixel velocity of a portion of the special feature points by comparing the RGB portions of the second and third RGB-D images. In another embodiment, the method also includes converting determined pixel velocity of the portion of the special feature points to velocity in physical space using depth data of the second and third RGB-D images.

In one embodiment, the method also includes receiving RGB image data from an RGB camera assembly; receiving a first depth-map data set from a first ultrasonic array corresponding to a first portion of the RGB image data; receiving a second depth-map data set from a second ultrasonic array corresponding to a second portion of the RGB image data; and combining the corresponding depth-map data sets and RGB image data to generate a first RGB-D image.

In another embodiment, the method includes aligning the RGB image data and the first and second depth-map data sets. In a further embodiment, the method also includes cropping the first and second depth-map data sets. In a still further embodiment, said cropping the first and second depth-map data sets comprises cropping a first portion of the first depth-map data set that does not correspond to the RGB image data and cropping a second portion of the second depth-map data set that does not correspond to the RGB image data.

In one embodiment, the method also includes processing depth-map data received from the ultrasonic array via beamforming. In another embodiment the first and second depth-map data sets have a lower resolution than a resolution of the RGB image data. In a further embodiment, the method also includes upsampling the depth-map data to a higher resolution that is equal to the resolution of the RGB image data. In a still further embodiment, the method includes using a Features from Accelerates Segment Test (FAST) algorithm for corner detection in the RGB data. In one embodiment, the method also includes using a Binary Robust Independent Elementary Features (BRIEF) algorithm to identify feature descriptors of the RGB data.

Another aspect includes a system for determining optical-flow in physical space, wherein said system implements any of the methods discussed above. A further aspect includes a computer program product for determining optical-flow in physical space, the computer program product being encoded on one or more machine-readable storage media and comprising instruction for executing any of the methods discussed above. A still further aspect includes a computer program product, wherein the method of determining optical-flow in physical space as described above is provided as a series of instructions stored on non-transitory storage medium.

One aspect includes a computer program product for determining optical-flow in physical space, the computer program product being encoded on non-transitory machine-readable storage media and having instruction for generating a first RGB-D image; instruction for identifying a plurality of special interest points in an RGB portion of the first RGB-D image; instruction for generating a second RGB-D image; instruction for determining a pixel velocity of a portion of the special feature points by comparing the RGB portions of the first and second RGB-D images; and instruction for converting determined pixel velocity of the portion of the special feature points to velocity in physical space using depth data of the first and second RGB-D images.

Another aspect includes an optical-flow imaging system including: a first ultrasonic sensor array; a Red, Green Blue (RGB) camera; and a processing module for determining optical-flow velocities of a plurality of special feature points in physical space, wherein the special feature points are identified in RGB image data, and wherein depth data associated with the special feature points is used to obtain units in physical space.

A further aspect includes an optical-flow imaging system that includes: a housing; a depth sensor; a Red, Green Blue (RGB) camera assembly positioned on said housing and operably connected to said first ultrasonic sensor array, said RGB camera including a photosensitive imaging chip and a lens; and a processing module configured to determine optical-flow velocities of a plurality of special feature points in physical space, wherein the special feature points are identified in RGB image data, and wherein depth data associated with the special feature points is used to obtain units in physical space.

In one embodiment the depth sensor includes a first ultrasonic sensor array that has an ultrasonic emitter and a plurality of ultrasonic sensors. In another embodiment the first ultrasonic sensor array can be position on a housing. In one embodiment, the first ultrasonic array and the photosensitive imaging chip are positioned in a parallel plane on the housing. In another embodiment, said first ultrasonic sensor array and photosensitive imaging chip are positioned in a parallel plane on the housing at a distance of 10 cm or less.

In a further embodiment, the ultrasonic sensors are positioned on a substrate in a matrix configuration having rows and columns, and said ultrasonic emitter is positioned within the matrix configuration between the rows and columns. A still further embodiment includes a processor and a memory positioned within the housing and operably connected to said first ultrasonic sensor array and said RGB camera assembly.

One embodiment includes a display positioned on the housing. Another embodiment includes a second ultrasonic sensor array positioned on the housing and operably connected to said first ultrasonic sensor array and said RGB camera assembly. In a further embodiment, the first and second ultrasonic array and the photosensitive imaging chip are positioned in a parallel plane on the housing. In a still further embodiment, the first and second ultrasonic array and the photosensitive imaging chip are positioned in a linear configuration with the photosensitive imaging chip positioned between the first and second ultrasonic array.

On embodiment includes a plurality of paired ultrasonic sensor arrays with each respective pair positioned in a different parallel plane. In another embodiment, said RGB camera assembly comprises an infrared-cut filter. In a further embodiment, said RGB camera assembly comprises an infrared-pass filter and wherein the photosensitive imaging chip is configured to detect infrared light.

In one embodiment, the processing module is configured to identifying a plurality of special interest points in an RGB portion of an RGB-D image. In a still further embodiment, the processing module is configured to determine a pixel velocity of a portion of the special feature points by comparing the RGB portions of a first and second RGB-D image. In another embodiment, the processing module is configured to convert determined pixel velocity of the portion of the special feature points to velocity in physical space using depth data of the first and second RGB-D images.

In one embodiment, the processing module is configured to use a Features from Accelerates Segment Test (FAST) algorithm for corner detection in RGB image data to identify one or more special characteristic point. In another embodiment, the processing module is configured to use a Binary Robust Independent Elementary Features (BRIEF) algorithm to identify feature descriptors in RGB image data. In a further embodiment, the RGB image data is a portion of an RGB-D image.

One aspect includes a moving platform comprising the optical-flow imaging system according to any one of the embodiments discussed above. In one embodiment, the moving platform is an unmanned aerial vehicle. In another embodiment, the processing module is configured to navigate the moving platform based on said determined optical-flow velocities.

BRIEF DESCRIPTION OF THE DRAWINGS

FIG. 2 is an exemplary drawing illustrating an embodiment of combining depth data with RGB data.

FIG. 12 illustrates an example of two-dimensional optical-flow of a rotating circle between a first and second image, wherein the image capture device remains stationary.

FIG. 13 illustrates an example of two and three dimensional optical-flow images generated by rotation of the image capture device relative to a stationary sphere.

Figure 1:
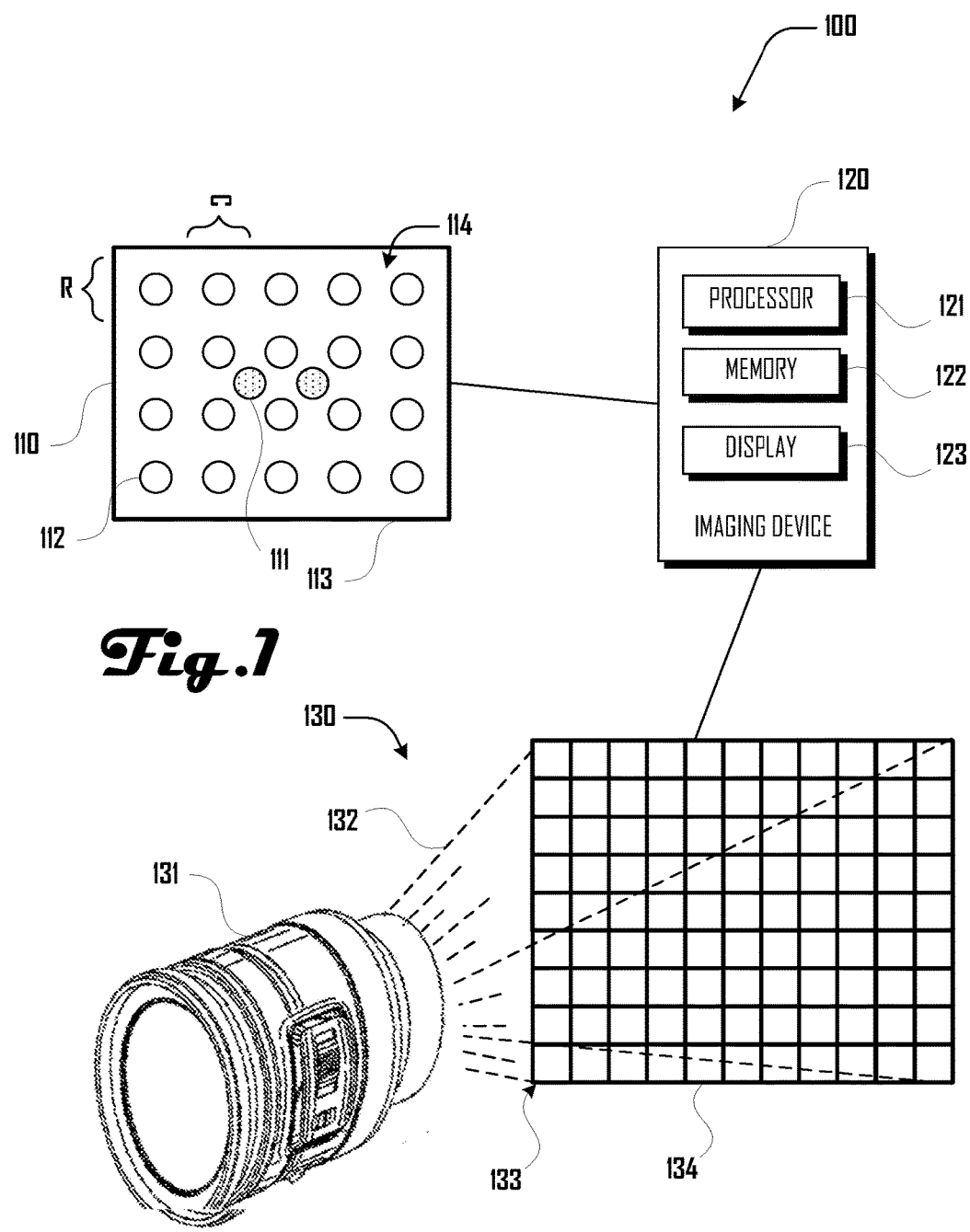
FIG. 1 is an exemplary top-level drawing illustrating an embodiment of an optical-flow imaging system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available optical-flow imaging systems and methods fail to work in a variety of operating conditions such as outdoors in sunlight and conventional optical-flow methods only provide velocity in pixel space and fail to provide velocities in physical space, an optical-flow imaging system that includes ultrasonic depth (or distance) sensing can prove desirable and provide a basis for a wide range of imaging applications, such as spatial imaging, navigation, three dimensional mapping, and the like.

In contrast to conventional optical-flow imaging systems, an ultrasonic array that uses beamforming can acquire three-dimensional maps including depth information without being subject to ambient light interference. Additionally, ultrasonic sensors use substantially less power than optical-flow systems using infrared sensors and thus can be desirable for mobile or moving platforms such as unmanned aerial vehicles (UAVs), and the like. These results can be achieved, according to one embodiment disclosed herein, by an optical-flow imaging system 100 as illustrated in FIG. 1.

Turning to FIG. 1, the optical-flow imaging system 100 is shown as comprising an ultrasonic sensor array 110 that is operably connected to an imaging device 120, and an RGB camera assembly 130 that is operably connected to the imaging device 120.

In various embodiments, the ultrasonic sensor array 110 can comprise a plurality of ultrasonic sensors 112 positioned on a substrate 113 in a matrix 114 defined by a plurality of rows R and columns C. One or more ultrasonic emitters 111 can be positioned on the substrate 113 within the matrix 114 between the rows R and columns C of ultrasonic sensors 112. In further embodiments, one or more ultrasonic emitters 111 can be positioned outside of the matrix 114 in any suitable position about the optical-flow imaging system 100. For example, one or more ultrasonic emitters 111 can be positioned in the same, parallel or a separate plane from the matrix 114.

In some embodiments, the substrate 113 can include a single ultrasonic emitter 111 or any suitable plurality of ultrasonic emitters 111 arranged or positioned in any desirable or suitable configuration on the substrate 113. Additionally and/or alternatively, the substrate 113 can include any suitable plurality of ultrasonic sensors 112 arranged or positioned in any desirable or suitable configuration, which may or may not be a matrix 114 configuration. In various embodiments, the ultrasonic sensor array 110 can comprise a piezoelectric transducer, a capacitive transducer, magnetostrictive material, or the like. Accordingly, in various embodiments, any suitable array that provides for the transmission and/or sensing of sound waves of any suitable frequency can be employed without limitation.

The camera assembly 130 can comprise a lens 131 that is configured to focus light 132 onto a light sensing array (or chip) 133 of pixels 134 that converts the received light 132 into a signal that defines an image as discussed herein. Although the lens 131 is depicted as a digital single-lens reflex (DSLR) lens, any suitable type of lens can be used. For example, the lens 131, in some embodiments, the lens 131 can comprise any suitable lens system, including a pin-hole lens, a biological lens, a simple convex glass lens, or the like. Additionally, lenses in accordance with various embodiments can be configured with certain imaging properties including a macro lens, zoom lens, telephoto lens, fisheye lens, wide-angle lens, or the like.

While the camera system 130 can be used to detect light in the visible spectrum and generate images therefrom, the camera system 130, in some embodiments, can be adapted to detect light of other wavelengths including, X-rays, infrared light, micro waves, or the like. Additionally, the camera system 130 can comprise one or more filter. For example, the camera system 130 can comprise an infrared-cut filter that substantially filters out infrared wavelengths in a manner that can be desirable for operation of the RGB-D system in environments where infrared interference is an issue. In another example, the camera system 130 can comprise an infrared-pass filter that filters out substantially all wavelengths except for infrared wavelengths, and the light sensing array or chip 133 can be configured to sense infrared wavelengths.

The camera system 130 can also be adapted for still images, video images, and three-dimensional images, or the like. Accordingly, the present disclosure should not be construed to be limiting to the example camera system 130 shown and described herein.

As illustrated in FIG. 1, the imaging device 120 can comprise a processor 121, a memory 122, and a display 123. The camera system 130 and ultrasonic sensor array 110 can be operatively connected to the imaging device 120 so that images (or data) generated by the camera system 130 and ultrasonic sensor array 110 can be processed by the processor 121 and/or stored in the memory 122. Processed images can be presented on the display 123.

In further embodiments, any of the processor 121, memory 122 and display 123 can be present in a plurality and/or can be absent. For example, in some embodiments, an optical-flow imaging system 100 does not include a display 123 and generated images discussed herein are sent to another computing device or display where such images can be presented.

Figure 4:
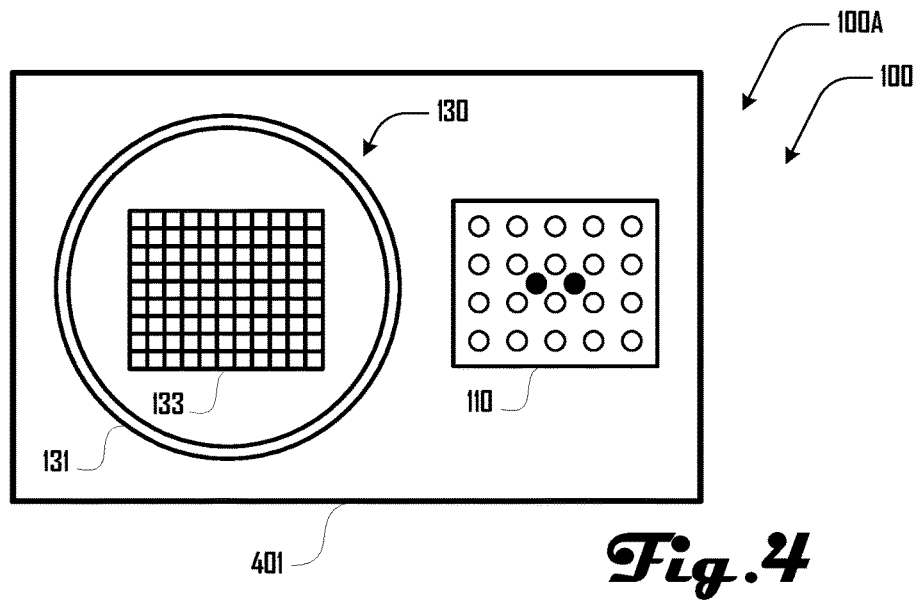
FIG. 4 is an exemplary front-view drawing illustrating an alternative embodiment of the optical-flow imaging system of FIG. 1, wherein the optical-flow imaging system includes one RGB camera system and one ultrasonic depth sensor.
Figure 7:
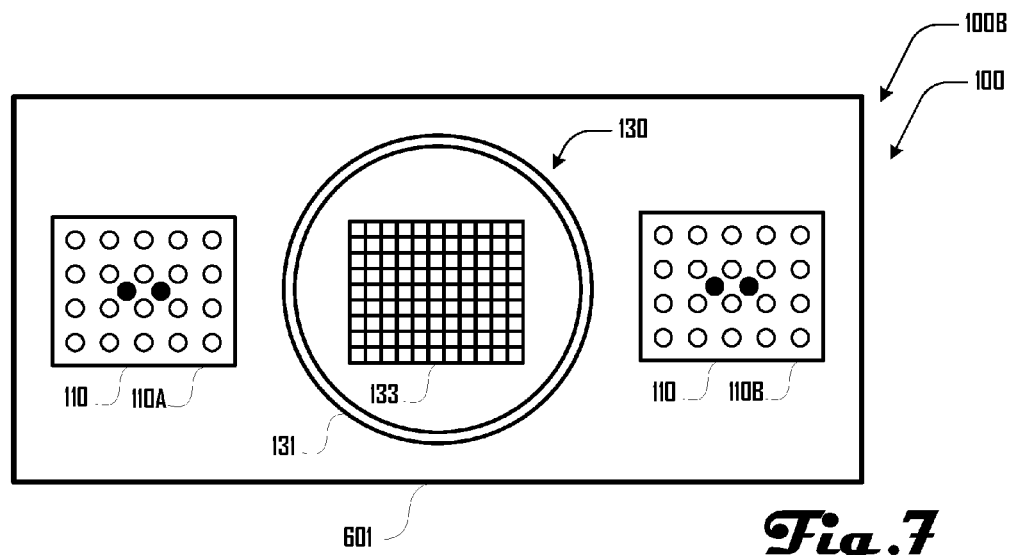
FIG. 7 is an exemplary front-view drawing illustrating another alternative embodiment of the optical-flow imaging system of FIG. 1, wherein the optical-flow imaging system includes one RGB camera system and two ultrasonic depth sensors.
Figure 16:
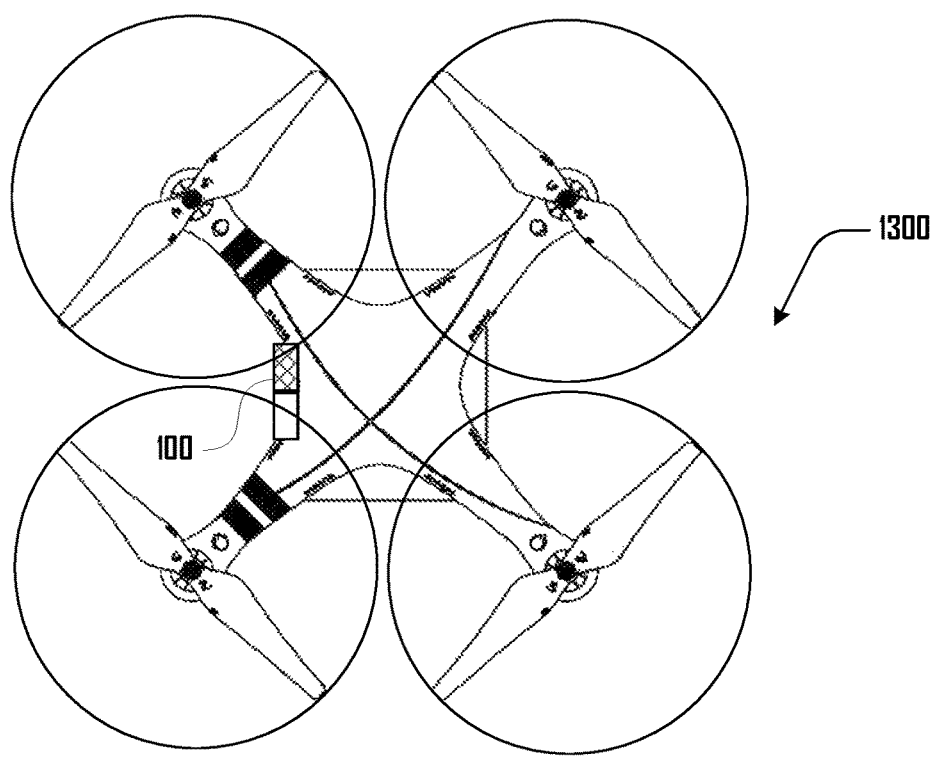
FIG. 16 illustrates an embodiment of an unmanned aerial vehicle (UAV) that includes the optical-flow imaging system of FIG. 1.

In some embodiments, any of the camera system 130, imaging device 120, and ultrasonic sensor array 110 can be present in any suitable plurality. For example, as discussed in more detail herein and as illustrated in FIG. 4, one embodiment 100A of an optical-flow imaging system 100 can comprise one camera system 130 and one ultrasonic sensor array 110. In another example, as discussed in more detail herein, and as illustrated in FIG. 7, one embodiment 100B of an optical-flow imaging system 100 can comprise one camera system 130 and two ultrasonic sensor arrays 110. Additionally, one or more optical-flow imaging system 100 can be positioned on a UAV 1300 as shown in FIGS. 16 and 17.

Figure 10:
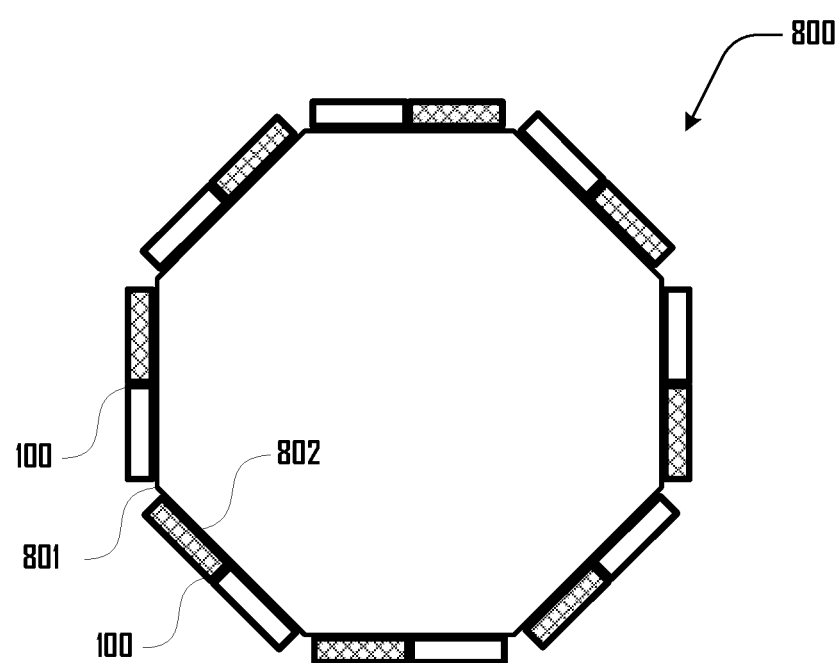
FIG. 10 illustrates an embodiment of an RGB-D imaging assembly that includes a plurality of optical-flow imaging systems.
Figure 17:
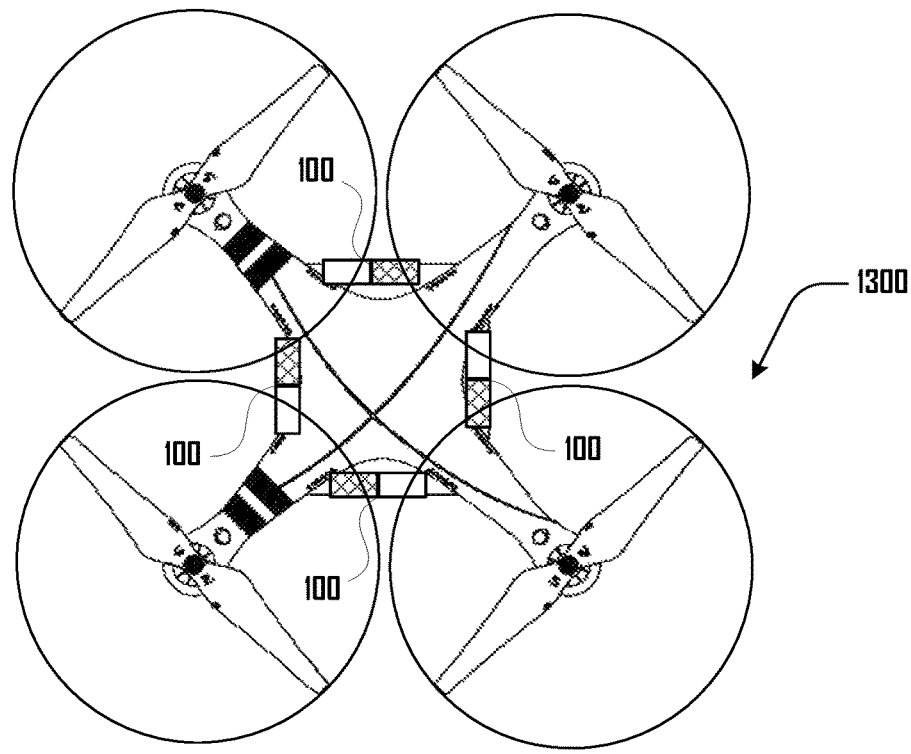
FIG. 17 illustrates an alternative embodiment of the UAV of FIG. 16, wherein the UAV includes a plurality of the optical-flow imaging systems.

In a further example, as discussed in more detail herein, and as illustrated in FIGS. 10 and 17, a three-dimensional imaging system 800 can comprise a plurality of optical-flow imaging systems 100 that each comprise one camera system 130 and one or more ultrasonic sensor arrays 110. In such an embodiment, each optical-flow imaging system 100 can be associated with an individual imaging device 120 (shown in FIG. 1) or each optical-flow imaging system 100 can be associated with a central or common imaging device 120. In other words, associated sets of camera systems 130 and ultrasonic sensor arrays 110 can each be associated with imaging device 120 and/or can be operatively connected with a central or common imaging device 120.

As discussed in more detail herein, an optical-flow imaging system 100 can be configured to generate RGB-D images. For example, referring to FIGS. 1, 2 and 3, the camera system 130 can be configured to generate an RGB triplet image 210 comprising pixel arrays for red, green and blue values 211R, 211G, 211B. The ultrasonic sensor array 110 can be configured to generate a depth-map array 220. As discussed in detail herein, the RGB triplet image 210 and depth-map array 220 can be combined to generate an RGB-D quad image 230 that comprises the pixel arrays for red, green and blue values 211R, 211G, 211B and the depth-map array 220. Accordingly, each pixel location of the RGB-D quad image 230 is associated with a red value (R), a green value (G), and a blue value (B) in addition to a depth or distance value (D) corresponding to a distance from the ultrasonic sensor array 110 or optical-flow imaging system 100.

In some embodiments, as depicted in FIG. 2, the RGB triplet image 210 and depth-map array 220 can have the same resolution and size (i.e., the same number of pixels for a defined image size). In such an embodiment, the RGB triplet image 210 and depth-map array 220 can be added together in the manner illustrated in FIG. 2.

Figure 3:
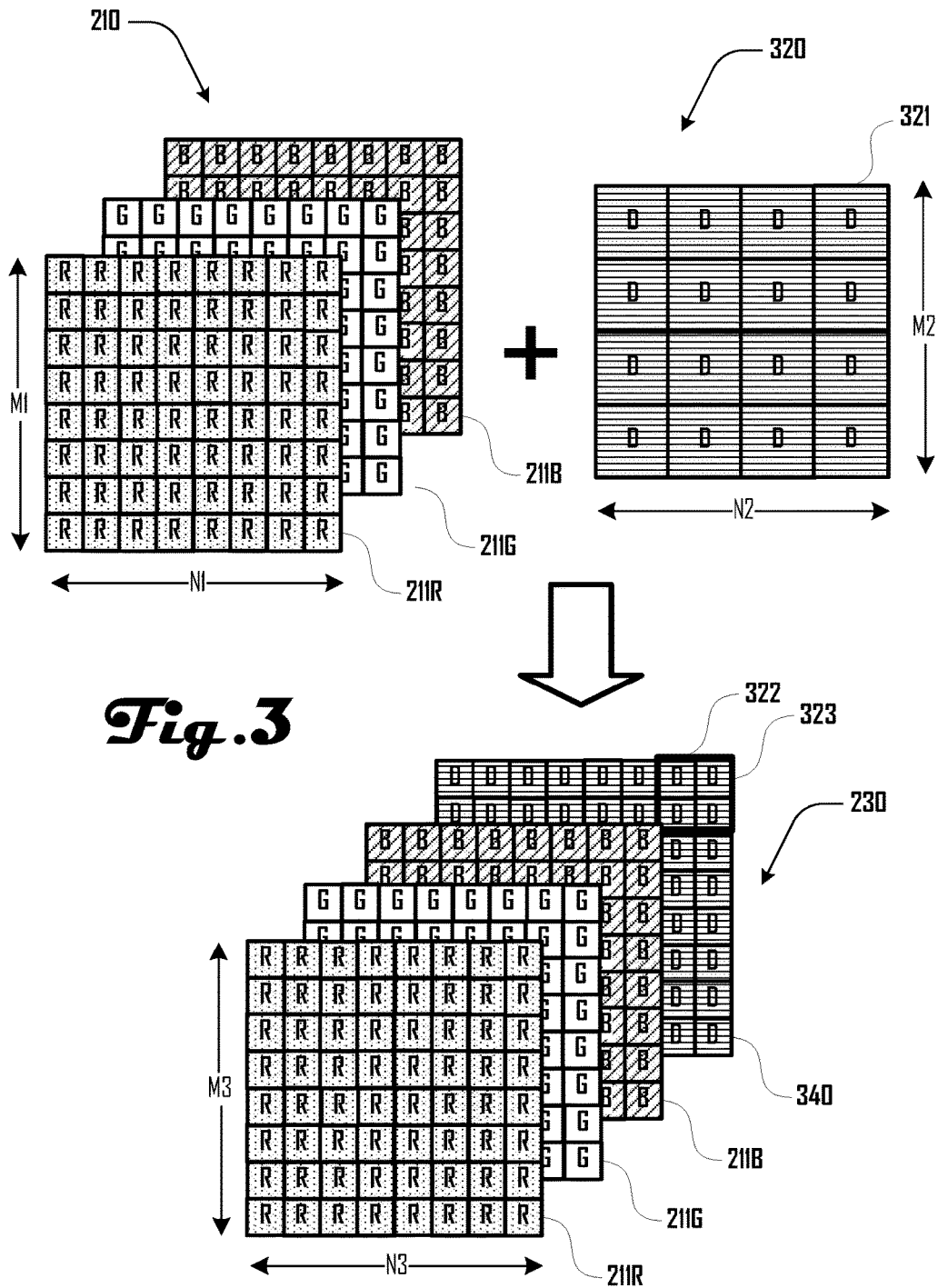
FIG. 3 is an exemplary drawing illustrating an alternative embodiment of combining depth data with RGB data.

However, in some embodiments, as depicted in FIG. 3, the RGB triplet image 210 and depth-map array 320 can have different resolutions (i.e., a different number of pixels for a defined image size). For example, the pixel arrays for red, green and blue values 211R, 211G, 211B in FIG. 3 are 8×8 pixels in an image size of N1×M1 whereas the depth-map array 320 is 4×4 pixels in an image size of N2×M2. In an embodiment where N1=N2 and M1=M2, the RGB triplet image 210 and/or depth-map array 320 can be modified for combination to form the RGB-D quad image 230. In the example shown in FIG. 3, the depth-map array 320 can be upsampled to 8×8 pixels in an image size of N3×M3. The result is that the distance value of pixel 321 in the lower resolution depth-map array 320 is used in association with the pixels 322 in the highlighted set 323 of four pixels present in the upsampled depth-map array 340 present in the RGB-D quad image 230.

In this example, upsampling of the lower resolution 4×4 depth-map array 320 to the higher resolution 8×8 depth-map array 340 results in a clean upsampling given that pixel 321 can be cleanly split into four pixels 323. However, in further embodiments, conversion of a lower resolution depth map array 320 can require interpolation of certain pixels during upsampling (e.g., upsampling of a 4×4 image to an 11×11 image, or the like). In such an embodiment, any suitable interpolation method can be used, which can include nearest neighbor, bilinear, bicubic, bicubic smoother, bicubic sharper, and the like.

In some embodiments, interpolation of distance values can be based on the distance value. In other words, interpolation can be treated differently for larger distances compared to smaller differences. For example, where distance values indicate that an object is in the far background (e.g., mountains, cloud) interpolation can be different compared to foreground object or object that are close to the optical-flow imaging system 100. In some embodiments, RGB triplet image 210 and/or depth-map array 220 can be resampled, and the method of resampling of the RGB triplet image 210 and/or depth-map array 220 can be based on distance values.

Although some embodiments include an RGB triplet image 210 and depth-map array 320 where N1=N2 and M1=M2, in further embodiments, the RGB triplet image 210 and depth-map array 320 can be different sizes. For example, in some embodiments, the RGB triplet image 210 can be larger than the depth-map array 320. In other embodiments, the RGB triplet image 210 can be smaller than the depth-map array 320. Additionally, in various embodiments, a ratio of M3/N3 can be the same as a ratio of M1/N1 and/or a ratio of M2/N2; whereas, the ratio of M3/N3 can be different from the ratio of M1/N1 and/or the ratio of M2/N2 in other embodiments.

The optical-flow imaging system 100 can be embodied in various suitable ways, for example, as depicted in FIG. 4, one embodiment 100A includes ultrasonic sensor array 110 and camera system 130 positioned on a housing 401. Turning to FIG. 4, the imaging device 120 (shown in FIG. 1) can be positioned in and/or on the housing 401. For example, the processor 121 (shown in FIG. 1) and memory 122 (shown in FIG. 1) can be positioned at suitable locations within the housing 401, and the display 123 (shown in FIG. 1) can be positioned on a suitable portion of the housing 401.

Figure 5:
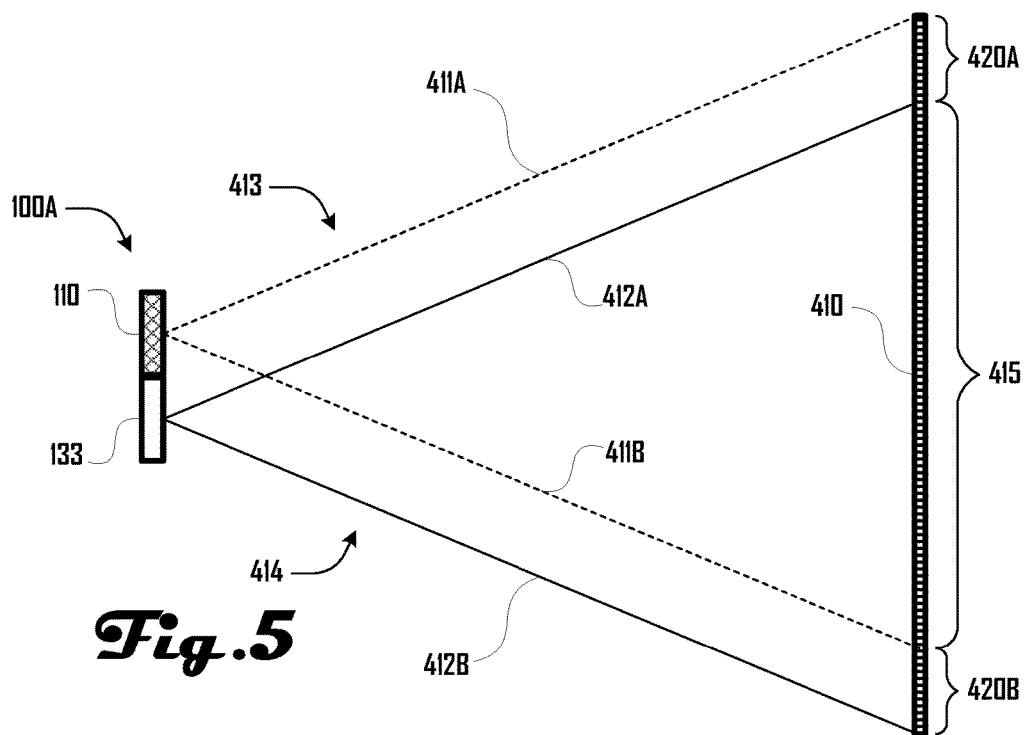
FIG. 5 is an exemplary top-view drawing illustrating the field of view of the optical-flow imaging system of FIG. 4.

FIG. 5 is an exemplary top-view drawing illustrating the field of view of the optical-flow imaging system of FIG. 4. As depicted in FIGS. 4 and 5, the ultrasonic sensor array 110 and photosensitive imaging chip 133 can be positioned side-by-side in a common and/or parallel plane on the housing 401. In a preferred embodiment, the ultrasonic sensor array 110 and photosensitive imaging chip 133 are separated by a distance no greater than 10 cm. As used herein, the terms 'common plane' and 'parallel plane' are not intended to be synonyms, and these terms are intended to be distinct.

The ultrasonic sensor array 110 can have a field of view 413 defined by edges 411A, 411B and the photosensitive imaging chip 133 can have a field of view 414 defined by edges 412A, 412B. As illustrated in FIG. 5, the fields of view 413, 414 can be offset. In other words, images generated by the photosensitive imaging chip 133 and ultrasonic sensor array 110 may not be exactly the same because of the physical distance of the imaging chip 133 and ultrasonic sensor array 110 on the housing. In this example embodiment, the fields of view 413, 414 are shown relative to a surface 410 and comprise an overlapping portion 415 and respective offset portions 420A, 420B, where the fields of view are not overlapping. More specifically, the offset 420A is present in the ultrasonic sensor array field of view 413 but is not present in the photosensitive imaging chip field of view 414; whereas, the offset 420A is present in the photosensitive imaging chip field of view 414 but is not present in the ultrasonic sensor array field of view 413.

Overlapping portion 415 can be identified and/or determined in various suitable ways. For example, in one embodiment, the size of overlapping portion 415 may be known (or assumed), and non-overlapping portions 420 can be automatically cropped based on the known (or assumed) size. In further embodiments, images can be aligned via any suitable machine vision and/or image processing method. For example, in one embodiment, a Features from Accelerates Segment Test algorithm (FAST algorithm) can be used for corner detection in the images to identify one or more special characteristic point. A Binary Robust Independent Elementary Features algorithm (BRIEF algorithm) can be used to identify feature descriptors of an image. A Hamming distance between the identified descriptors of the two images can be used to identify an overlapping region of the first and second image.

Accordingly, respective images and distance maps generated by the imaging chip 133 and ultrasonic sensor array 110 can include portions that do not correspond to each other, which can be undesirable when these images and distance maps are combined to form an RGB-D image. In other words, for an RGB-D image to accurately indicate the distance value at a given pixel, images and distance maps may need to be aligned so that the right distance values corresponds to the right RGB pixels. In some embodiments, offset distance and offsets 420A, 420B can be considered to be negligible, and images and distance maps may not be aligned. In further embodiments, where offset distance is substantially constant, images and distance maps can be aligned based on a known (or defined) distance. For example, in an embodiment where the sensor array 110 and photosensitive imaging chip 133 are positioned in parallel planes, the geometric distance between the sensor array 110 and photosensitive imaging chip 133 can be included in a known or defined distance used for alignment. Similarly, where the sensor array 110 and photosensitive imaging chip 133 are positioned in a common plane, the geometric distance between the sensor array 110 and photosensitive imaging chip 133 can be included in a known or defined distance used for alignment.

However, where offset distance varies (e.g., due to subject object's distance from the imaging system 100, environmental conditions, or the like), alignment can be performed based on distance values of a distance map. In some embodiments where offset changes based on distance, it can be desirable to identify objects of interest in the field of view and optimize alignment of images and distance maps so that objects of interest are more accurately aligned. For example, there can be a determination that a foreground object at a distance of 1 meter is an object of interest and that the background objects over 20 meters away are less important. Accordingly, alignment can be optimized for the 1 meter distance instead of the 20 meter distance so that distance data corresponding to the foreground object is more accurate and aligned compared to background distance data.

Determining object of interest can be done in any suitable way and can be based on various setting (e.g., close-up, mid-distance, far, people, landscape, or the like). Such objects of interest can be identified based on suitable machine vision and/or artificial intelligence methods, or the like. In further embodiments, alignment of images and distance maps can be done using feature detection, extraction and/or matching algorithms such as RANSAC (RANdom SAmple Consensus), Shi & Tomasi corner detection, SURF blob detection (Speeded Up Robust Features), MSER blob detection (Maximally Stable Extremal Regions), SURF descriptors (Speeded Up Robust Features), SIFT descriptors (Scale-Invariant Feature Transform), FREAK descriptors (Fast REtinA Keypoint), BRISK detectors (Binary Robust Invariant Scalable Keypoints), HOG descriptors (Histogram of Oriented Gradients), or the like.

In various embodiments, it can be desirable to crop portions of images and/or distance maps that do not correspond to each other. For example, as shown in FIG. 5, for an image captured of the object 410, portions 420A, 420B can be cropped from respective images and distance maps to leave overlapping portion 415.

Figure 6:
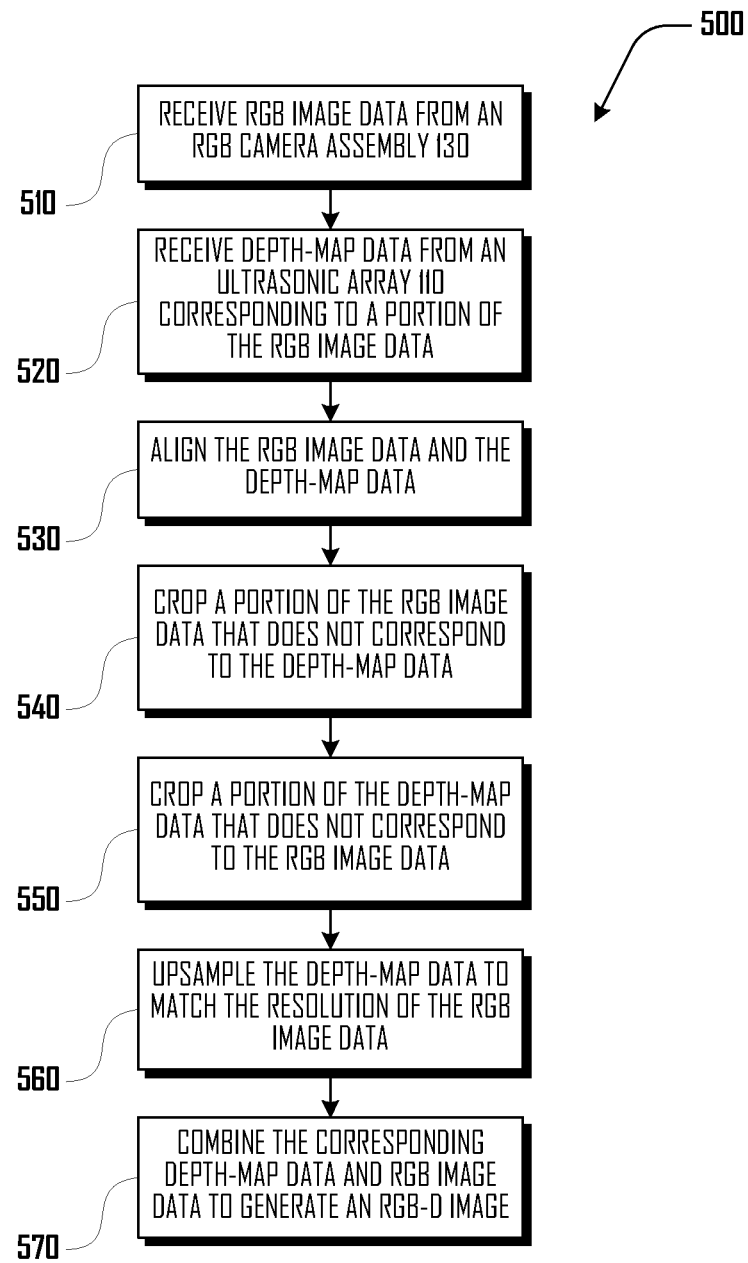
FIG. 6 is an exemplary flow chart illustrating an embodiment of a method of generating an RGB-D image in accordance with an embodiment.

FIG. 6 illustrates an exemplary method 500 of generating an RGB-D image in accordance with an embodiment. The method 500 begins, in block 510, where RGB image data is received from an RGB camera assembly 130 (shown in FIGS. 1 and 4), and in block 520 depth-map data is received from an ultrasonic array 110 (shown in FIGS. 1 and 4) corresponding to a portion of the RGB image data.

In block 530, the RGB image data and the depth-map data is aligned. In block 540, a portion of the RGB image data that does not correspond to the depth-map data is cropped, and, in block 550, a portion of the depth-map data that does not correspond to the RGB data is cropped. In block 560, the depth-map data is upsampled to match the resolution of the RGB image data, and, in block 570, the corresponding depth-map data and RGB image data are combined to generate an RGB-D image.

As depicted in FIG. 7, another embodiment 100B of an optical-flow imaging system 100 includes a first and second ultrasonic sensor array 110A, 110B and camera system 130 positioned on a housing 601. The imaging device 120 (shown in FIG. 1) can be positioned in and/or on the housing 601. For example, the processor 121 (shown in FIG. 1) and memory 122 (shown in FIG. 1) can be positioned within the housing 601, and the display 123 (shown in FIG. 1) can be positioned on a suitable portion of the housing 601.

Figure 8:
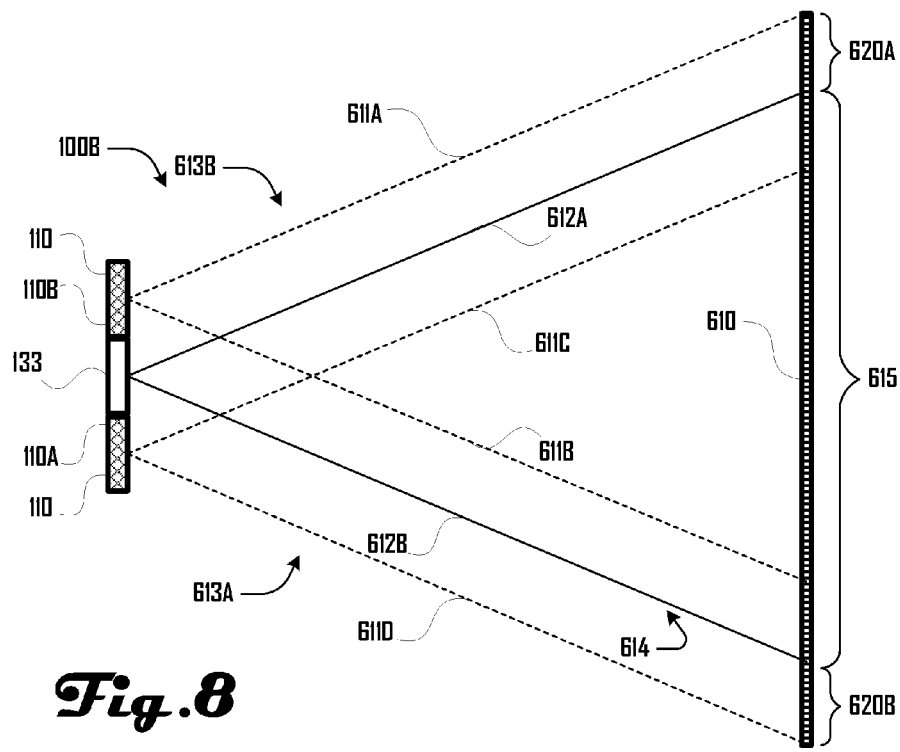
FIG. 8 is an exemplary top-view drawing illustrating the field of view of the optical-flow imaging system of FIG. 7.

As depicted in FIGS. 7 and 8, the ultrasonic sensor arrays 110 and photosensitive imaging chip 133 can be positioned side-by-side in a parallel or common plane on the housing 401 in a linear configuration with the photosensitive imaging chip 133 positioned between the first and second ultrasonic arrays 110A, 110B. In a preferred embodiment, the photosensitive imaging chip 133 is separated from the respective ultrasonic sensor arrays 110 by a distance no greater than 10 cm.

In the manner discussed in more detail above with reference to FIG. 5, the ultrasonic sensor arrays 110A, 110B can have fields of view 613A, 613B defined by edges 611C, 611D and 611A, 611B, respectively. The photosensitive imaging chip 133 can have a field of view 614 defined by edges 612A, 612B. As illustrated in FIG. 8, the fields of view 613A, 613B, 614 can be offset. In other words, images generated by the photosensitive imaging chip 133 and ultrasonic sensor arrays 110 may not be exactly the same because of the physical distance of the imaging chip 133 and ultrasonic sensor arrays 110 on the housing 601. In this example embodiment, the fields of view 613A, 613B, 614 are shown relative to a surface 610, and comprise an overlapping portion 615 and offset portions 620A, 620B, where the fields of view 613A, 613B, 614 are not overlapping. More specifically, neither the offset 620A nor the offset 620B is present in the photosensitive imaging chip field of view 614; whereas, the overlapping portion 615 includes corresponding image data from the imaging chip field of view 614 and depth-map data from one or both of the array fields of view 613A, 613B.

Figure 9:
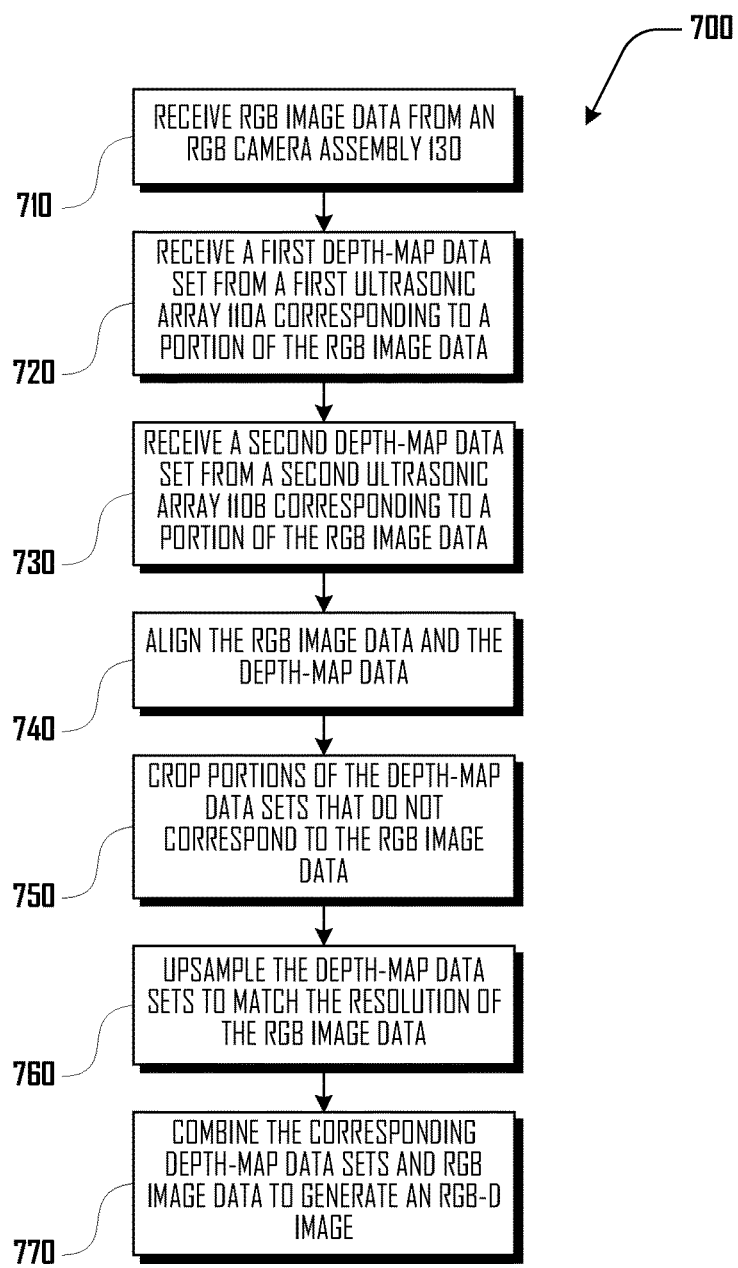
FIG. 9 is an exemplary flow chart illustrating an embodiment of a method of generating an RGB-D image in accordance with an embodiment.

FIG. 9 illustrates a method 700 of generating an RGB-D image in accordance with an embodiment. The method 700 begins, in block 710, where RGB image data is received from an RGB camera assembly 130 (shown in FIGS. 1 and 7). In block 720, a first depth-map data set is received from a first ultrasonic array 110A (shown in FIGS. 1 and 4) corresponding to a portion of the RGB image data, and, in block 730, a second depth-map data set is received from a second ultrasonic array 110A (shown in FIGS. 1 and 7) corresponding to a portion of the RGB image data.

In block 740, the RGB image data and the depth-map data are aligned with each other. In block 750, portions of the depth-map data sets that do not correspond to the RGB image data are cropped, and, in block 760, the depth-map data sets are upsampled to match the resolution of the RGB image data. Accordingly, in various embodiments, one or both of the first and second depth-map data sets have a lower resolution than the resolution of the RGB image data. In block 770, the corresponding depth-map data sets and RGB image data are combined to generate an RGB-D image.

FIG. 10 illustrates an embodiment of an RGB-D imaging assembly 800 that includes a plurality of optical-flow imaging systems 100, which are positioned on respective faces 802 of a housing 801. Although the example embodiment 800 of FIG. 10 is shown as being an octagon housing 801 having eight faces 802 with a respective imaging system 100 positioned on each face 802 for purposes of illustration only, the RGB-D imaging assembly 800 can include any suitable number of faces 802 and/or any suitable number of imaging systems 100 positioned on the faces 802 in various planes. Similarly, as illustrated in FIG. 17, a plurality of imaging systems 100 can be positioned on a UAV 1300.

Having a plurality of imaging systems 100 positioned in different planes can be desirable because the plurality of imaging systems 100 enable generation of panoramic and/or three dimensional RGB-D images that are a composite of a plurality of RGB image data and a plurality of distance-map data. Additionally, although the RGB-D imaging assembly 800 of FIG. 10 depicts the imaging systems 100 as being positioned at a common height in a common or parallel plane for purposes of illustration only, the RGB-D imaging assembly 800 can include a housing that can comprise a regular and/or irregular polyhedron, or the like.

Figure 11:
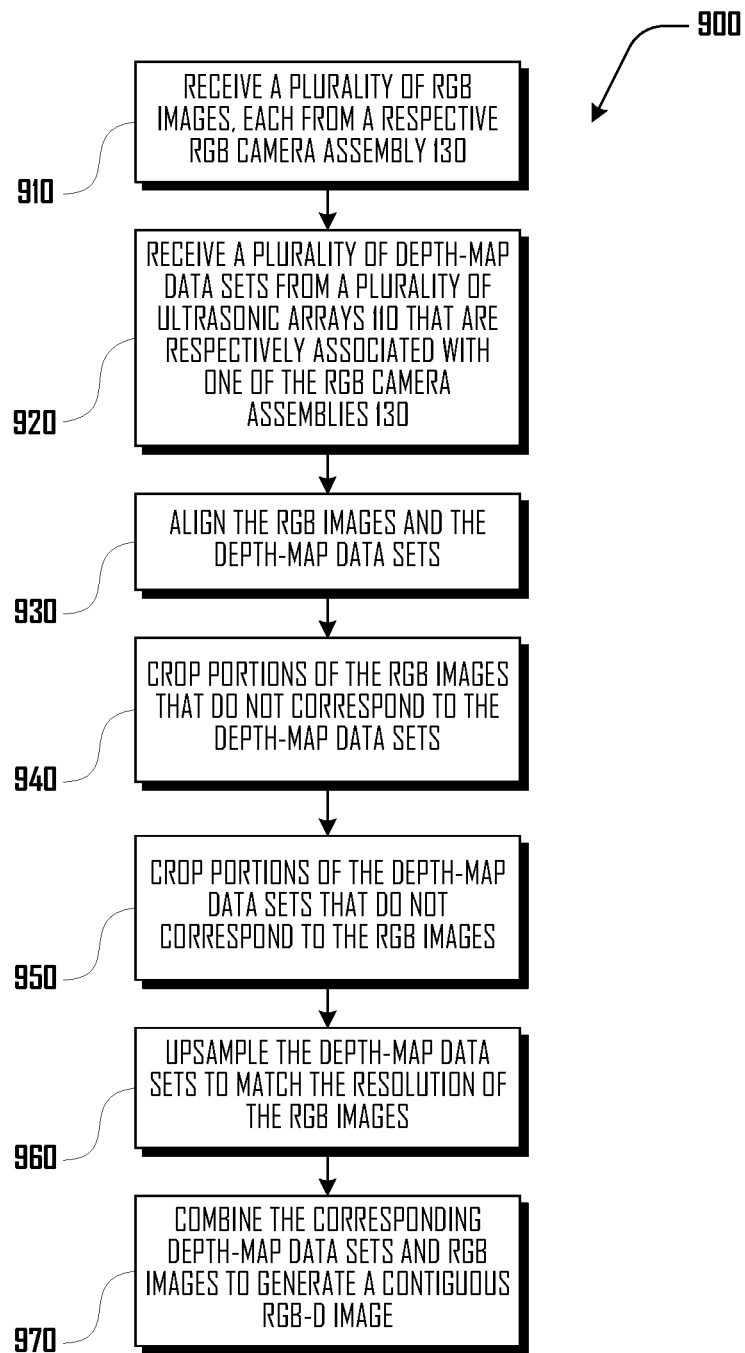
FIG. 11 is an exemplary flow chart illustrating an embodiment of a method of generating an RGB-D image in accordance with an embodiment.

FIG. 11 illustrates an embodiment of a method 900 of generating an RGB-D image in accordance with an embodiment. The method 900 begins, in block 910, where a plurality of RGB images are received, each from a respective RGB camera assembly 130 (shown in FIG. 1). In block 920, a plurality of depth-map sets are received from a plurality of ultrasonic arrays 110 (shown in FIG. 1) that are respectively associated with one of the RGB camera assemblies 130, and, in block 930, the RGB images and the depth-map data sets are aligned. In block 940, portions of the RGB images that do not correspond to the depth-map data sets are cropped, and, in block 950, portions of the depth-map data sets that do not correspond to the RGB images are cropped. In block 960, the depth-map data sets are upsampled to match the resolution of the RGB images, and, in block 970, the corresponding depth-map data sets and RGB images are combined to generate a continuous RGB-D image.

Turning to FIGS. 12 and 13, optical-flow is a pattern of apparent motion of objects, surfaces, and edges in a series of images, which pattern is caused by the relative motion between the camera assembly 130 and/or ultrasonic sensor array 110. For example, FIG. 12 depicts first and second images 1010, 1020 that both include a circle 1011. The camera that took the images 1010, 1020 is stationary. In the first image 1010, the circle 1011 is in a first position, and, in the second image 1020, the circle 1011 is in a second position being rotated clockwise relative to the first image 1010. An optical-flow image 1030 depicting the optical-flow between the first and second image 1030 depicts a plurality of vector arrows 1031 that show apparent motion of the circle 1011 from the first image 1010 to the second image 1020. Here, because only the circle is rotating, the vector arrows only illustrate apparent motion of the circle; whereas, no motion is apparent in the background because the camera is stationary in the example of FIG. 12.

However, as depicted in FIG. 13, presume that a sphere 1041 is stationary but that the observer camera rotates clockwise relative to the sphere 1041 about axis 1042, as depicted in illustration 1040. A resulting three dimensional optical-flow diagram 1050 of the sphere 1041 is illustrated by a plurality of vector arrows 1052. Similarly, a two dimensional optical-flow diagram 1060 is also illustrated by a plurality of vector arrows 1061.

However, calculating optical-flow by comparing sequential images may only provide optical-flow vectors in terms of pixels and not in terms of real-world distances. Although optical-flow velocities in terms of pixels can be useful for determining relative optical-flow in images, such optical-flow determinations have limited value when context within a real-world environment is desired. Accordingly, various embodiments provide for converting optical-flow velocities in terms of pixels into real-world distance optical-flow velocities by depth data obtained by an ultrasonic array 110 (shown in FIG. 1).

Figure 14:
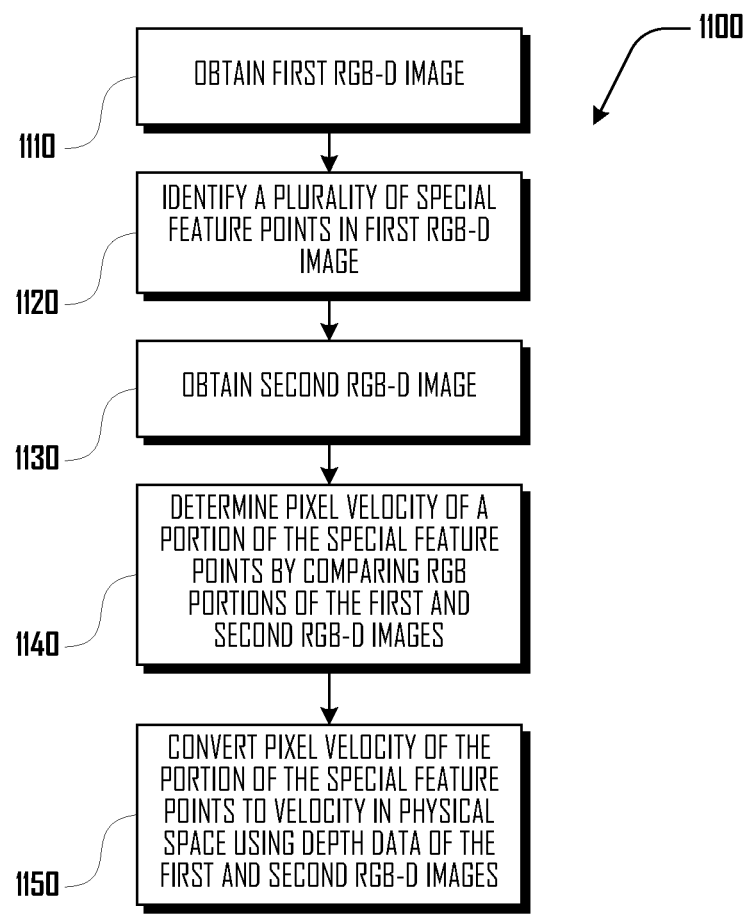
FIG. 14 is an exemplary flow chart illustrating an embodiment of a method a determining optical-flow in physical space in accordance with an embodiment.

For example, FIG. 14 illustrates an optical-flow method 1100 in accordance with one embodiment. The method 1100 begins, in block 1110, where a first RGB-D image is obtained. RGB-D images can be generated as described herein and/or may be generated via any other suitable RGB-D image generation method or system.

In block 1120, a plurality of special feature points are identified in the first RGB-D image. For example, in one embodiment, a Features from Accelerates Segment Test algorithm (FAST algorithm) can be used for corner detection in the first image to identify one or more special characteristic point. A Binary Robust Independent Elementary Features algorithm (BRIEF algorithm) can be used to identify feature descriptors of an image.

In block 1130, a second RGB-D image is obtained. Again, RGB-D images can be generated as described herein and/or may be generated via any other suitable RGB-D generation method or system.

In block 1140, a pixel velocity of a portion of the special feature points is determined by comparing the RGB portions of the first and second images 1010, 1020. In other words, the movement of special feature points can be identified by tracking the special feature points between the images 1010, 1020 and determining a pixel distance that special feature points move between the first and second images 1010, 1020. Such optical-flow calculations can be performed in any suitable way including a phase correlation method, a block-based method, a differential method, a discrete optimization method, and the like.

In block 1150, pixel velocity of the special feature points is converted into a velocity in physical space using depth data associated with the pixel positions on the special feature points.

Figure 15:
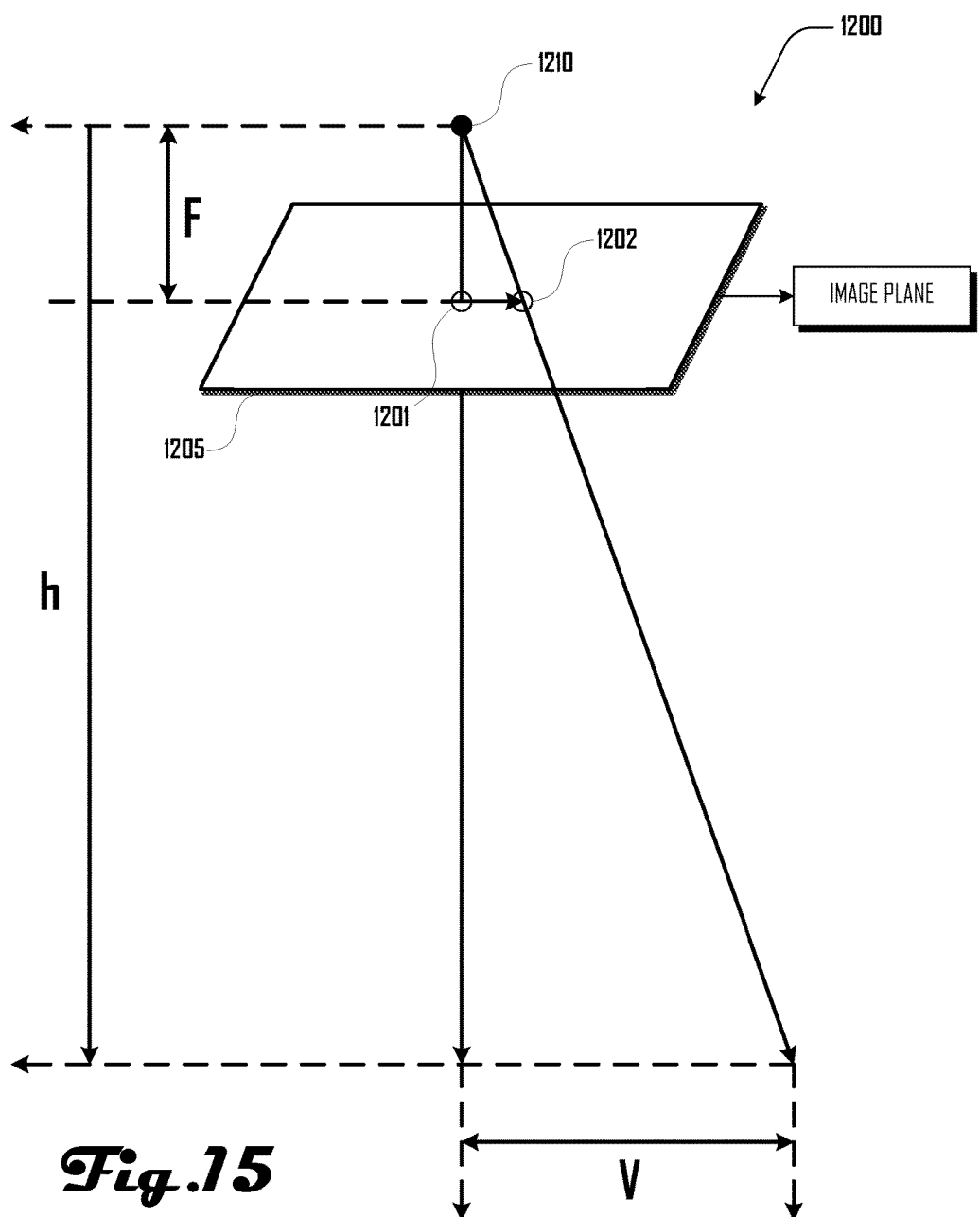
FIG. 15 is an exemplary flow chart illustrating an embodiment of a method of converting optical-flow in pixel distance to optical-flow in real-world distance in accordance with an embodiment.

For example, FIG. 15 illustrates one manner by which depth data of the RGB-D image can be used to convert pixel velocity into velocity in physical space for a special feature that moves from a first position 1201 to a second position 1202 in pixel space. As depicted in FIG. 15, V is a speed in physical space; u is the pixel speed on the image; h is the distance at the pixel point for the object measured by the ultrasound array; and F is the focus distance of the camera head 1210. Based on the principle of similar triangles, V/u=h/F. Therefore, V=u*h/F, which provides the speed in physical space.

In various embodiments, optical-flow in physical space can be determined in real time or with a delay based on captured video or a series of images. Accordingly, although the examples discussed above illustrate determining optical-flow in physical space by comparing a first and second image, optical-flow in physical space can be calculated between a first and second image, a second and third image, a third and fourth image, a fourth and fifth image, and the like.

In various embodiments, calculated optical-flow in physical space can be used in various suitable and desirable ways. In one embodiment, optical-flow data can be used for 3D modeling or for navigation by a mobile platform such as an unmanned aerial vehicle 1300 (UAV) (shown in FIGS. 16 and 17), or the like. For example, optical-flow data in physical space can be used for positioning that can replace and/or augment GPS or other positioning systems. Additionally, any of the methods discussed herein can be embodied in a software product, which can be stored as a series of instructions stored on any conventional storage medium, such as non-transitory storage medium, and/or can be operable to run on the processor 121 (shown in FIG. 1) or other suitable operating environments.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of determining a physical velocity in physical space, comprising:
   receiving depth data from a distance sensor;
   receiving image data from an imaging device being operably coupled with the distance sensor;
   aligning the received image data and the received depth data, comprising:
   generating a distance map based upon the received image data and the received depth data; and
   aligning the received image data and the received depth data based upon at least one distance value of the distance map;
   identifying a plurality of special feature points in the received image data;
   determining a pixel velocity from the identified special feature points; and
   converting the determined pixel velocity into the physical velocity based on the received depth data associated with the identified special feature points.

2. The method of claim 1, wherein said aligning further comprises determining an offset between the received image data and the received depth data and aligning the received image data and the received depth data based upon the determined offset.

3. The method of claim 2, wherein said determining the offset comprises determining that the offset is a constant value.

4. The method of claim 1, wherein said generating the distance map comprises identifying at least one object of interest in the received image data and the received depth data and aligning the received image data and received depth data based upon the at least one object of interest.

5. The method of claim 4, wherein said identifying the at least one object of interest comprises selecting the at least one object of interest from among a plurality of objects in the received image data and the received depth data.

6. The method of claim 5, wherein said selecting the at least one object of interest comprises selecting a foreground object among the plurality of objects.

7. The method of claim 1, wherein said receiving the depth data comprises receiving the depth data from the distance sensor with a first field of view, wherein said receiving the image data comprising receiving the image data from the imaging device with a second field of view that is different from the first field of view.

8. The method of claim 7, further comprising determining an offset between the first field of view and the second field of view and aligning the received image data and the received depth data based upon the determined offset.

9. The method of claim 7, further comprising determining an overlapping region between the first field of view and the second field of view and aligning the received image data and the received depth data based upon the overlapping region.

10. The method of claim 9, further comprising cropping a portion of the received depth data that is not associated with the overlapping region and cropping a portion of the received image data that is not associated with the overlapping region.

11. The method of claim 1, wherein said identifying the plurality of special feature points comprises identifying one or more of the special feature points via corner detection.

12. The method of claim 1, wherein said receiving the depth data from the distance sensor comprises:
   receiving a first depth-map data set from a first distance sensor corresponding to a first portion of the received image data; and
   receiving a second depth-map data set from a second distance sensor corresponding to a second portion of the received image data.

13. The method of claim 12, wherein said receiving the first depth-map data comprises receiving the first depth-map data from the first distance sensor that is separate from the second distance sensor.

14. The method of claim 12, wherein said receiving the first depth-map data comprises receiving the first depth-map data set via a first ultrasonic array, and wherein said receiving the second depth-map data comprises receiving the second depth-map data set via a second ultrasonic array.

15. The method of claim 12, wherein a first resolution of the received first depth-map data set is less than a resolution of the received image data, and wherein a second resolution of the received second depth-map data set is less than a resolution of the received image data.

16. The method of claim 15, further comprising upsampling the received first depth-map data set to a first predetermined resolution that is equal to the resolution of the received image data and upsampling the received second depth-map data set to a second predetermined resolution that is equal to the resolution of the received image data.

17. The method of claim 12, further comprising generating an image from the received first depth-map data set, the received second depth-map data set and the received image data.

18. The method of claim 1, further comprising cropping a selected portion of the received depth data that is not associated with the received image data.

19. The method of claim 1, further comprising cropping a selected portion of the received image data that is not associated with the received depth data.

20. A computer program product for determining a physical velocity in physical space, the computer program product being encoded on non-transitory machine-readable storage media and comprising:
  instruction for receiving depth data from a distance sensor;
  instruction for receiving image data from an imaging device being operably coupled with the distance sensor;
  instruction for aligning the received image data and the received depth data, comprising:
    instruction for generating a distance map based upon the received image data and the received depth data and
    instruction for aligning the received image data and the received depth data based upon at least one distance value of the distance map;
  instruction for identifying a plurality of special feature points in the received image data;
  instruction for determining a pixel velocity from the identified special feature points; and
  instruction for converting the determined pixel velocity into the physical velocity based on the received depth data associated with the identified special feature points.

21. An imaging system for determining a physical velocity in physical space, comprising:
  a first distance sensor for providing first depth data with a first field of view;
  a second distance sensor for providing second depth data with a second field of view being different from the first field of view;
  a first red-green-blue (RGB) photosensitive imaging chip for providing first image data with a third field of view being different from the first and second fields of view and being operably coupled with said first distance sensor; and
  a second RGB photosensitive imaging chip for providing second image data with a fourth field of view being different from the first, second and third fields of view and being operably coupled with said second distance sensor; and
  a processor for:
    aligning the first image data with the first depth data based upon a first overlapping region between the first field of view and the third field of view;
    generating a first red-green-blue-depth (RGB-D) image from the aligned first image data with the aligned first depth data;
    aligning the second image data with the second depth data based upon a second overlapping region between the second field of view and the fourth field of view;
    generating a second RGB-D image from the aligned second image data with the aligned second depth data;
    identifying a first plurality of special feature points in an RGB portion of the first RGB-D image and a second plurality of special feature points in an RGB portion of the second RGB-D image;
    determining a pixel velocity from first and second pluralities of special feature points; and
    converting the determined pixel velocity into the physical velocity based on the depth data associated with the first and second pluralities of special feature points.

22. An imaging system for determining a physical velocity in physical space, comprising:
  a distance sensor for providing depth data;
  a photosensitive imaging chip for providing image data and being operably coupled with said distance sensor; and
  a processor for:
    aligning the received image data and the received depth data, comprising:
      generating a distance map based upon the received image data and the received depth data and
      aligning the received image data and the received depth data based upon at least one distance value of the distance map;
    identifying a plurality of special feature points in the received image data;
    determining a pixel velocity from the identified special feature points; and
    converting the determined pixel velocity into the physical velocity based on the received depth data associated with the identified special feature points.

23. The imaging system of claim 22, wherein said distance sensor and said photosensitive imaging chip are positioned in a parallel plane.

24. The imaging system of claim 22, wherein said distance sensor comprises a distance sensor array.

25. The imaging system of claim 24 wherein said distance sensor array comprises:
  an emitter for transmitting a distance sensing signal; and
  a plurality of sensors for receiving a reflection of the distance sensing signal.

26. The imaging system of claim 25,
  wherein said plurality of sensors are positioned on a substrate in a matrix configuration having rows and columns, and
  wherein said emitter is positioned between a selected pair of adjacent rows and between a selected pair of adjacent columns of the matrix configuration.

27. The imaging system of claim 22, wherein said distance sensor comprises a plurality of paired sensor arrays each being positioned in a respective parallel plane.

28. The imaging system of claim 22, wherein the imaging system is positioned aboard a moving platform.

* * * * *